United States Patent [19]

Sakashita et al.

[11] Patent Number: 4,742,110

[45] Date of Patent: May 3, 1988

[54] POLYTEREPHTHALAMIDE COMPOSITION HAVING GEL PROPORTION, FG, OF 3–90%

[75] Inventors: Takeshi Sakashita, Iwakuni; Yurimasa Zenitani, Ohno; Akio Ikeda, Ohtake; Kenichi Nishiwaki, Waki, all of Japan

[73] Assignee: Mitsui Petrochemical Industries, Ltd., Tokyo, Japan

[21] Appl. No.: 919,150

[22] PCT Filed: Feb. 21, 1986

[86] PCT No.: PCT/JP86/00086

§ 371 Date: Oct. 7, 1986

§ 102(e) Date: Oct. 7, 1986

[87] PCT Pub. No.: WO86/04907

PCT Pub. Date: Aug. 28, 1986

[30] Foreign Application Priority Data

Feb. 21, 1985 [JP] Japan .................................. 60-31567

[51] Int. Cl.$^4$ .......................... C08L 77/10; C08L 77/08

[52] U.S. Cl. ..................... 524/538; 524/606; 525/432; 528/338; 528/339; 528/340; 528/342

[58] Field of Search ............... 528/347, 338, 339, 340, 528/342; 525/432; 524/538, 606

[56] References Cited

U.S. PATENT DOCUMENTS 3,081,273 3/1963 Caprio ................................ 528/347
3,642,710 2/1972 Keen et al. ......................... 528/347

FOREIGN PATENT DOCUMENTS

WO86/0086 8/1986 PCT Int'l Appl. ................. 528/347

*Primary Examiner*—Harold D. Anderson
*Attorney, Agent, or Firm*—Sherman and Shalloway

[57] ABSTRACT

A polyamide composition comprising a polycondensate of 60 to 100 mole % of terephthalic acid component units and 40 to 0 mole % of units of an aromatic carboxylic acid other than terephthalic acid with an aliphatic alkylene-diamine having 6 to 18 carbon atoms and having a gel proportion of 6 to 90% as measured at 50° C. in concentrated sulfuric acid.

8 Claims, No Drawings

POLYTEREPHTHALAMIDE COMPOSITION HAVING GEL PROPORTION, FG, OF 3-90%

TECHNICAL FIELD

The present invention relates to a polyamide composition which is excellent in all of heat-resistant characteristics, mechanical characteristics, chemical and physical characteristics and molding characteristics.

Background Art

Thermoplastic resins such as polyolefins, polyesters and polyamides can be molded by melt molding such as compression molding, injection molding or extrusion molding and are excellent in the moldability, but they are not satisfactory as engineering plastics in heat-resistant characteristics, mechanical characterisitics and chemical characteristics. Therefore, these thermoplastic resins are used as general-purpose molding resins while utilizing excellent characteristics thereof.

As conventional engineering plastics excellent in heat-resistant characteristics, mechanical characteristics and chemical and physical characteristics, there are known polytetrafluoroethylene (Teflon ®), poly-p-phenyleneterephthalamide (Kebler ®), a polyimide composed of a condensate of 4,4'-diaminodiphenyl ether and pyromellitic anhydride (Kapton ®), polyhexamethyleneadipamide (6,6-nylon), ,4-trimethylhexamethyleneterephthalamide (Trogamid ®), polyphenylenesulfide and polyacetal. Of these plastics, polytetrafluoroethylene, polyterephthaloyl-p-phenylene-diamine and the above-mentioned polyimide resin are excellent in heat-resistant characteristics, mechanical characteristics and chemical and physical characteristics, but they are defective in that melt molding is impossible. Therefore, the application fields are considerably limited. Of the foregoing engineering plastics, polyphenylenesulfide, polyhexamethylene-adipamide (6,6-nylon), poly-2,2,4-trimethylhexamethylene-terephthalamide (Trogamid T ®) and polyacetal are characterized in that melt molding is possible. However, polyphenylenesulfide is inferior in heat-resistant characteristics such as melting point, glass transition point and thermal distortion temperature and mechanical characteristics such as impact strength and abrasion resistance, and polyamides such as polyhexamethyleneadipamide (6,6-nylon) and poly-2,2,4-trimethylhexamethyleneterephthalamide (Trogamid T ®) are inferior in heat-resistant characteristics such as glass transition point and thermal distortion temperature, mechanical characteristics such as tensile strength, flexural strength, critical PV value and abrasion resistance, and chemical and physical characteristics such as chemical resistance, boiling water resistance and saturated water absorption. Furthermore, polyacetal is inferior in heat-resistant characteristics such as melting point and thermal distortion temperature and mechanical characteristics such as flexural strength, impact strength and abrasion resistance.

DISCLOSURE OF THE INVENTION

It is therefore a primary object of the present invention to provide a polyamide composition which is excellent in molding characteristics such as melt flowability, melt compression moldability, melt injection moldability and melt extrusion moldability and is prominently improved in mechanical characteristics such as tensile strength, flexural strength and impact strength and thermal characteristics such as thermal distortion temperature and thermal aging resistance.

In accordance with the present invention, there is provided a polyamide composition having fractions which are insoluble and soluble, respectively, in concentrated $H_2SO_4$ at 50° C. comprising a polycondensate consisting of (a) 60 to 100 mole % of terephthalic acid component units and 40 to 0 mole % of units of an aromatic dicarboxylic acid component other than the terephthalic acid component and (b) units of an aliphatic alkylene-diamine component having 6 to 18 carbon atoms, wherein the gel proportion (Fg) defined by the following formula:

$$Fg = Wg/W \times 100 \quad (1)$$

wherein W stands for the weight in grams of the polyamide composition and Wg stands for the weight in grams of the fraction of the polyamide composition which is insoluble in concentrated sulfuric acid at 50° C., is in the range of from 6% to 90%, and the fraction soluble in concentrated sulfuric acid at 50° C. has an intrinsic viscosity ($\eta$) of at least 0.5 dl/g as measured in concentrated sulfuric acid as 30° C.

The polyamide composition of the present invention is characterized in that since the gel proportion is within the above-mentioned range, the polyamide composition is excellent in heat-resistant characteristics such as melting point, glass transition point and thermal distortion temperature, mechanical characteristics such as thermal aging resistance, tensile strength, flexural strength, impact strength, kinetic friction coefficient and Taber abrasion, chemical and physical characteristics such as chemical resistance, boiling water resistance and saturated water absorption, and molding characteristics such as melt flowability, melt compression moldability, melt injection moldability and melt extrusion moldability.

Best Mode for Carrying Out the Invention

In the polyamide composition of the present invention, the aromatic dicarboxylic acid component units (a) may be composed solely of terephthalic acid component units or may comprise units of the terephthalic acid components and units of an aromatic dicarboxylic acid component other than the terephthalic acid component. As the aromatic dicarboxylic acid other than terephthalic acid, there can be mentioned isophthalic acid, phthalic acid, 2-methylterephthalic acid, naphthalene-dicarboxylic acid, diphenyldicarboxylic acid and 2,2-bis(4-carboxyphenyl)methane. Among them, isophthalic acid and naphthalene-dicarboxylic acid are preferred. It is indispensable that terephthalic acid should be present in an amount of 60 to 100 mole % and the aromatic dicarboxylic acid other than terephthalic acid should be present in an amount of 40 to 0 mole %.

If the content of terephthalic acid component units is lower 60 mole % or the content of the other aromatic dicarboxylic acid component units is higher than 40% in the aromatic dicarboxylic acid units (a), heat-resistant characteristics such as thermal distortion temperature, mechanical characteristics such as tensile strength and abrasion resistance and chemical and physical characteristics such as chemical resistance and water resistance are degraded in the polyamide composition.

The aromatic dicarboxylic acid component units (a) comprise as main units the terephthalic acid component units and the units of the other aromatic dicarboxylic acid component. However, the units (a) may comprise minor amounts of units of a polycarboxylic acid having a valency of at least 3, such as trimellitic acid or pyromellitic acid, in addition to the above-mentioned indispensable components.

In the polyamide composition of the present invention, the aliphatic alkylene-diamine units are units of an aliphatic alkylene diamine having 6 to 18 carbon atoms. As the aliphatic alkylene diamine, there can be mentioned 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1.8-diamino-1,3-dimethyloctane, 1,8-diamino-1,4-dimethyloctane, 1.8-diamino-2,4-dimethyloctane, 1,8-diamino-3,4-dimethyloctane, 1.8-diamino-4,5-dimethyloctane, 1.8-diamino-2,2-dimethyloctane, 1.8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane. Among these aliphatic alkylene-diamine component units (b), 1,6-diaminohexane component units, 1,8-diamino-octane component units, 1,10-diaminodecane component units, 1,12-diaminododecane component units and units of mixtures thereof are preferred, and 1,6-diaminohexane component units and 1,10-diaminodecane component units are especially preferred.

The polyamide composition of the present invention comprises the above-mentioned diamine as the indispensable component. However, the diamine units (b) may further comprise units of a polyamine having a valency of at least 3, such as diethylene-triamine or triethylene-tetraamine.

In an especially preferred embodiment of the present invention, the aliphatic alkylene-diamine component units (b) are units of an aliphatic alkylenediamine having 6 carbon atoms, and the content of the terephthalic acid component units is 60 to 85 mole % and the content of the units of an aromatic dicarboxylic acid component other than the terephthalic acid component is 15 to 40 mole %. In this preferred polyamide composition of the present invention, mechanical characteristics such as tensile strength, flexural strength and impact strength and moldability characteristics are especially highly improved and especially good results are obtained. In another preferred embodiment, the aliphatic alkylene-diamine component units (b) constituting the polyamide are units of an aliphatic alkylene diamine having 8 carbon atoms, and the content of the terephthalic acid component units is 65 to 100 mole % and the content of the units of an aromatic dicarboxylic acid component other than the terephthalic acid component is 0 to 35 mole %. In this preferred polyamide composition of the present invention, mechanical characteristics such as tensile strength, flexural strength and impact strength and moldability characteristics are especially highly improved and especially good results are obtained. In still another preferred embodiment, the aliphatic alkylene-diamine component units (b) constituting the polyamide are units of an aliphatic alkylene-diamine having 10 to 18 carbon atoms, and the content of the terephthalic acid components is 75 to 100 mole % and the content of units of an aromatic dicarboxylic acid component other than the terephthalic acid component is 0 to 25 mole %. In this preferred polyamide composition, mechanical characteristics such as tensile strength, flexural strength and impact strength and moldability characteristics are especially highly improved and especially good results are obtained.

The polyamide composition of the present invention comprises a polycondensate of the above-mentioned aromatic dicarboxylic acid component (a) and alkylenediamine component (b). In order to attain the object of the present invention, it is important that the gel proportion (Fg) defined by the above-mentioned formula (1) should be 3 to 90%, especially 4 to 85%, most preferably 5 to 80%.

This gel proportion (Fg) is determined according to the following method. A 1% by weight solution of a polyamide composition pulverized below 32 mesh in concentrated sulfuric acid is heated at 50° C. for 10 hours with stirring, and the temperature is returned to room temperature and the mixture is filtered by a gravity filter (2G). The polyamide in the precipitate and the polyamide in the filtrate are collected by precipitation with water, dried and weighed, respectively. The gel proportion is calculated from the ratio between the so-determined weights.

If the gel proportion (Fg) of the polyamide composition is too small and below the above-mentioned range, mechanical characteristics such as tensile strength, flexural strength and impact resistance and thermal aging resistance of a molded body prepared from the polyamide composition are inferior to those of a molded body prepared from a polyamide composition in which the gel proportion is within the range specified in the present invention. If the gel proportion (Fg) is too large and exceeds the above-mentioned range, the flowability of the polyamide composition is drastically reduced and moldability characteristics such as melt compression moldability, melt injection moldability and melt extrusion moldability are degraded.

The fraction soluble in concentrated sulfuric acid at 50° C. in the polyamide composition, that is, the uncrosslinked linear polymer component, has an intrinsic viscosity ($\eta$) of at least 0.5 dl/g, preferably at least 0.6 dl/g. especially preferably 0.7 to 3.0 dl/g, as measured in concentrated sulfuric acid at 30° C. If the intrinsic viscosity ($\eta$) is too low and below the above-mentioned range, the physical properties are readily degraded.

The melt flow rate (MFR) as determined at a temperature of 360° C. under a load of 2.16 Kg is not particularly critical in the polyamide composition, but the melt flow rate is ordinarily at least 0.01 g/10 min and especially at least 0.05 g/10 min.

In an embodiment of the composition of the present invention where the units (b) of the aliphatic alkylenediamine component having 6 to 18 carbon atoms are units of 1,6-diaminohexane, the melt flow rate (MFR) as determined at a temperature of 360° C. under a load of 2.16 Kg is ordinarily 0.01 to 100 g/10 min and preferably 0.05 to 50 g/10 min.

As disclosed in "Polymer Reviews 10. Condensation Polymers by Interfacial and Solution Methods" written by Paul W. Morgan and published by Interscience Publishers (1965) and Von H. Hopff and A. Krieger, Makromol. Chem., 47, 93–113 (1961), polyamides are generally prepared by polycondensing an aromatic dicarboxylic acid halide and an aliphatic alkylene-diamine by the solution method or by the interfacial method. Furthermore, polyamides can be prepared by polycondensing an aromatic dicarboxylic acid and an aliphatic alkylene-diamine or a nylon salt thereof in the presence or absence of a solvent such as water by the melting method. Polyamides prepared according to these methods are ordinarily soluble in concentrated sulfuric acid.

The polyamide composition of the present invention is prepared according to the following methods, though applicable methods are not limited to the methods described below. More specifically, there can be mentioned (1) a method in which a concentrated sulfuric acid-soluble polyamide prepared according to the above-mentioned method is subjected to solid phase polymerization so that the gel proportion (Fg) in concentrated sulfuric acid at 50° C. is 60 to 90%, (2) a method in which in preparing a polyamide by melt polycondensation, the polycondensation temperature is elevated and the final polycondensation temperature is, for example, elevated to a level exceeding 340° C. so that the gel proportion (Fg) is within the above-mentioned range, (3) a method in which in the above-mentioned polymerization method, the charge molar ratio (b)/(a) of the diamine component (b) to the dicarboxylic acid component (a) is adjusted to at least 1.01, preferably at least 1.03, so that the gel proportion (Fg) is controlled within the above-mentioned range, and (4) a method in which in polycondensing the diamine component (b) with the dicarboxylic acid component (a), a polyamine and/or polycarboxylic acid having a functionality of at least 3 is used in an amount of less than 5 mole % based on the diamine and/or dicarboxylic acid so that the gel proportion (Fg) is within the above-mentioned range.

Any of the foregoing methods can be adopted for the preparation of the polyamide composition of the present invention, but adoption of the method (1) or (2), especially the method (1), is preferred. When the polyamide composition is prepared, a catalyst or stabilizer such as phosphoric acid, sodium hypophosphite, octyl phosphate or tristridecyl phosphite can be added.

The polyamide composition of the present invention can also be obtained by preparing a concentrated sulfuric acid-insoluble polyamide-containing composition (B) according to any of the foregoing methods (1) through (4) and blending this composition (B) with a concentrated sulfuric acid-soluble polyamide (A) prepared according to the above-mentioned conventional method. In the composition (A) and the polyamide (B), the constituent monomer composition may be the same, or the monomer composition may be different so far as the above-mentioned requirement of the composition of the dicarboxylic acid and diamine is satisfied.

As means for mixing at least two components, there can be adopted a powder mixing method or a method using kneading means under melting and shearing conditions, such as an extruder or a kneader. At any rate, it is indispensable that the gel proportion should be within the above-mentioned range.

Known additives may be incorporated into the polyamide composition of the present invention according to need. As the component, other than the above-mentioned indispensable components, to be incorporated into the polyamide composition according to need, there can be mentioned known stabilizers, plasticizers, parting agents, lubricants and fillers. An organic or inorganic compound in the form of a powder, plate, fiber or cloth can be used as the filler. For example, there can be mentioned powders and plates of inorganic compounds such as silica, alumina, silica-alumina, talc, diatomaceous earth, clay, kaolin, quartz, glass, mica, graphite, molybdenum disulfide, gypsum, red iron oxide, titanium dioxide, zinc oxide, aluminum, copper and stainless steel, fibers of inorganic compounds such as glass fibers, carbon fibers, boron fibers, ceramic fibers, asbestos fibers and stainless steel fibers, secondary processed products thereof such as cloth articles, powders, plates and fibers of wholly aromatic polyamides such as poly-p-phenylene-terephthalamide, poly-m-phenylene-terephthalamide, poly-p-phenyleneisophthalamide, poly-m-phenylene-isophthalamide, a condensate of diaminodiphenyl ether with terephthalic acid (isophthalic acid) and a condensate of p(m)-aminobenzoic acid, wholly aromatic polyamide-imides such as a condensate of diaminodiphenyl ether with trimellitic anhydride or pyromellitic anhydride, wholly aromatic polyimides, heterocyclic ring-containing compounds such as polybenzimidazole and polyimidazophenanthroline and polytetrafluoroethylene, and secondary processed products thereof such as cloth articles. A mixture of two or more of these fillers may be used. Furthermore, these fillers may be used after they have been treated with a silane coupling agent or a titanium coupling agent.

Among the powdery fillers, there are preferably used silica, silica-alumina, alumina, titanium oxide, graphite, molybdenum disulfide and polytetrafluoroethylene. If graphite, molybdenum disulfide or polytetrafluoroethylene is used, abrasion resistance characteristics, such as kinetic friction coefficient, Taber abrasion and critical PV value, of a molded body prepared from the composition are especially improved. It is preferred that the average particle size of the filler be 0.1 m$\mu$ to 200$\mu$, especially 1 m$\mu$ to 100$\mu$, because the above-mentioned abrasion resistance characteristics are especially prominantly improved. The filler is incorporated in an amount of 0 to 200 parts by weight, preferably 0 to 100 parts by weight, especially preferably 0.5 to 50 parts by weight, per 100 parts by weight of the polyamide.

As the organic fibrous filler, there are preferably used fibers of wholly aromatic polyamides such as poly-p-phenylene-terephthalamide fibers, poly-m-phenylene-terephthalamide fibers, poly-p-phenylene-isophthalamide fibers, poly-m-phenylene-isophthalamide fibers and fibers prepared from a condensate of diaminodiphenyl ether with terephthalic acid or isophthalic acid, because a molded body prepared from the polyamide composition is especially highly imrpoved in mechanical characteristics such as tensile strength and Izod impact strength and heat-resistant characteristics such as thermal distortion temperature. Moreover, when glass fibers, carbon fibers or boron fibers are used as the inorganic fibrous filler, mechanical characteristics such as tensile strength, flexural strength and flexural modulus, heat-resistant characteristics such as thermal distortion temperature and chemical and physical characteristics such as water resistance are especially highly improved in a molded body prepared from the polyamide composition. If the average length of the organic or inorganic fibrous filler is ordinarily 0.1 to 20 mm, especially 1 to 10 mm, the moldability of the polyamide composition is improved and a molded body prepared from the polyimide composition is improved in headresistant characteristics such as thermal distortion temperature and mechanical characteristics such as tensile strength and flexural strength. The organic or inorganic fibrous filler is incorporated in an amount of 0 to 200 parts by weight, preferably 5 to 180 parts by weight, especially preferably 5 to 150 parts by weight, per 100 parts by weight of the polyamide.

INDUSTRIAL APPLICABILITY

The polyamide composition of the present invention can be molded by ordinary melt molding, for example, compression molding, injection molding or extrusion molding.

Since the polyamide composition of the present invention is excellent in mechanical characteristics, thermal characteristics, kinetic friction coefficient and low water absorption, the polyamide composition is effectively used in the fields of various machine parts, structural materials, vessels and construction materials.

EXAMPLES

The polyamide composition of the present invention will now be described in detail with reference to the following examples. Furthermore, synthesis of polyamides used in the examples and comparative examples is illustrated in referential examples. Furthermore, the method for preparing test pieces and the methods for evaluating the physical properties are illustrated.

Incidentally, MFR is measured according to the method of JIS K-7210.

Abbreviations used in Table 1 indicate the following compounds.

TA: terephthalic acid
IA: isophthalic acid
$C_6DA$: 1,6-diaminohexane
$C_{10}DA$: 1,10-diaminodecane (Polyamide Compositions, Preparation of Test Pieces and Methods for Evaluation of Physical Properties)

A polyamide composition comprising (A) a concentrated sulfuric acid-soluble polyamide and (B) a concentrated sulfuric acid-insoluble polyamide was prepared by pulverizing (below 32 mesh) polyamides by a crusher, drying them at 100° C. under 1 mmHg for 12 hours and dry-blending them in a nitrogen atmosphere (in the case where a polyamide composition was already prepared in the polyamide-preparing method, a pulverized product is directly used for evaluation of the physical properties). The polyamide composition was hot-pressed in a nitrogen atmosphere under a pressure of 100 kg/cm² at a temperature higher by 20° C. than the melting point of the concentrated sulfuric acid-soluble polyamide (A) by a press molding machine and was then cold-pressed at 20° C. to form a compression-molded plate having a thickness of 2 to 10 mm. The molded plate was cut into a test piece having a size shown in Table 1. Then, the test piece was allowed to stand still in an atmosphere maintained at a temperature of 23° C. and a relative humidity of 65% for 96 hours and was subjected to tests.

In case of a glass fiber-incorporated product, a predetermined amount of a dry polyamide was mixed with a predetermined amount a glass fiber (Chopped Strand CS 6PE-231 supplied by Nitto Boseki K.K.; average length=6 mm) in a monoaxial extruder (L/D=28, 20 mm in diameter) to form a strand having a length of 8 to 10 mm. A test piece was prepared in the same manner as described with respect to a glass fiber-free product.

TABLE 1

| Test Items | Test Methods | Size (mm) of Test Piece |
|---|---|---|
| Tensile strength | ASTM D-638 | TYPE 4 115 × 19 × 4 |
| Flexural strength | ASTM D-790 | 63.5 × 12.7 × 2.0 |
| Flexural modulus | ASTM D-790 | 63.5 × 12.7 × 2.0 |
| Izod impact strength | ASTM D-256, notched | 63.5 × 12.7 × 4.0 |
| Thermal distortion temperature | ASTM D-648, load of 18.6 kg/cm² | 127 × 12.7 × 4.0 |
| Taber abrasion | ASTM D-1044, CS-17, 1 kg, 1000 rpm | 120 φ × 2.0 |
| Kinetic friction coefficient | Matsubara method CS-17, rotation speed of 0.2 m/sec | outer diameter: 25.6, inner diameter: 20, height: 10 |
| Critical PV value | Matsubara method CS-17, rotation speed of 0.2 m/sec | outer diameter: 25.6, inner diameter: 20, height: 10 |
| Saturated water absorption | D570, 23° C., 65% RH | TYPE 4 115 × 19 × 4 |

(I) Preparation of Concentrated Sulfuric Acid-Soluble Polyamide (A)

REFERENTIAL EXAMPLE 1

A 1-liter autoclave was charged with 123.6 g (0.744M) of terephthalic acid, 52.9 g (0.318M) of isophthalic acid, 123.4 g (0.062M) of hexamethylenediamine and 74 g of deionized water, and the inside atmosphere was sufficiently substituted with $N_2$ and the temperature was elevated to 250° C. over a period of 2 hours with stirring. In the closed state, the reaction was further advanced at 250° C. for 1 hour, and stirring was stopped and the reaction mixture was taken out from the bottom of the autoclave under a pressure difference of 10 kg/cm². The reaction product was dried overnight in $N_2$ at 100° C. under 100 mmHg. By a biaxial extruder (screw diameter - 30 mm, L/D=42, barrel temperature (°C.)=30/260/280/300/300/320/320/340/340/340, 4th and 6th zones vented to open air, 1 mmHg in 8th zone, rotation number =80 rpm, oligomer feed rate =2 kg/hr, exhaust by $N_2$ purging), the obtained oligomer was polycondensed to increase the molecular weight. The obtained results are shown in Table 2.

REFERENTIAL EXAMPLE 2

A polyamide was synthesized in the same manner as described in Referential 1 except that 97.04 g (0.584M) of terephthalic acid and 79.4 g (0.478M) of isophthalic acid were used. The obtained results are shown in Table 2.

TABLE 2

|  | Referential Example 1 | Referential Example 2 |
|---|---|---|
| Starting Material |  |  |
| amount (g) used of TA | 123.6 | 97.0 |
| amount (g) used of IA | 52.9 | 79.4 |

TABLE 2-continued

|  | Referential Example 1 | Referential Example 2 |
|---|---|---|
| kind of diamine component units | $C_6DA$ | $C_6DA$ |
| content (mole %) of TA component units in aromatic dicarboxylic acid component units | 70 | 55 |
| Oligomer |  |  |
| ($\eta$) (dl/g, conc $H_2SO_4$, 30° C.) | 0.10 | 0.10 |
| content (mole %) of TA component units in aromatic dicarboxylic acid component units | 71 | 55 |
| Polyamide |  |  |
| ($\eta$) (dl/g, conc $H_2SO_4$, 30° C.) | 0.98 | 1.05 |
| melting point (°C.) | 334 | 300 |
| content (mole %) of TA component units in aromatic dicarboxylic acid component units | 71 | 55 |

(II) Preparation of Polyamide Containing Concentrated Sulfuric Acid-Insoluble Polyamide (B)

REFERENTIAL EXAMPLE 3

The oligomer described in Referential Example 1 was subjected to solid phase polymerization at 280° C. under 1 mmHg without stirring for 8 hours to increase the molecular weight (at the initial stage of the polymerization, a part of the polyamide was fused to the vessel wall). The obtained results are shown in Table 3.

REFERENTIAL EXAMPLE 4

A polyamide was synthesized in the same manner as described in Referential Example 3 except that the oligomer was synthesized by changing the amount of hexamethylene-diamine to 129.6 g (1.115M). The obtained results are shown in Table 3.

REFERENTIAL EXAMPLE 5

The polyamide described in Referential Example 1 was subjected to solid phase polymerization at 280° C. under 1 mmHg for 8 hours. The obtained results are shown in Table 3.

REFERENTIAL EXAMPLE 6

A polyamide was synthesized in the same manner as described in Referential Example 4 except that the amounts of terephthalic acid and isophthalic acid were changed to 132.3 g (0.797M) and 44.1 g (0.266M), respectively. The obtained results are shown in Table 3.

REFERENTIAL EXAMPLE 7

A 10-l reaction vessel equipped with a stirring rod, a thermometer and a reflux cooler was charged with 232 g (1.40M) of terephthalic acid, 241 g (1.4M) of 1,10-diaminodecane and 10 l of deionized water, and reaction was carried out at 95° to 100° C. in an $N_2$ atmosphere for 1 hour. The obtained transparent solution was air-cooled and precipitated nylon salt was collected by filtration under suction and dried at 100° C. under 100 mmHg to obtain 450 g (95%) of a nylon salt of terephthalic acid/1,10-diaminodecane. A 1-l reaction vessel was charged with 450 g (1.33M) of the nylon salt, and the pressure was reduced to 1 mmHg and $N_2$ current was introduced to produce an $N_2$ atmosphere in the reaction vessel. Under an $N_2$ current, reaction was carried out at 300° C. for 1.5 hours and water formed by the reaction was expelled from the reaction vessel, whereby 390 g (97%) of a polyamide comprising terephthalic acid and 1,10-diaminodecane (($\eta$)=0.54 dl/g in conc. $H_2SO_4$ at 30° C.). The polyamide was pulverized (below 32 mesh) by a crusher, dried at 80° C. under 50 mmHg for 12 hours and subjected to solid phase polymerization at 300° C. under 0.7 mmHg for 20 hours to synthesize a polyamide comprising terephthalic acid component units and 1,10-diaminodecane component units. The obtained results are shown in Table 2.

REFERENTIAL EXAMPLE 8

The polyamide described in Referential Example 1 was subjected to solid phase polymerization at 310° C. under 1 mmHg for 20 hours. The obtained results are shown in Table 3.

REFERENTIAL EXAMPLE 9

The polyamide described in Referential Example 1 was subjected to solid phase polymerization at 300° C. under 1 mmHg for 15 hours. The obtained results are shown in Table 3.

TABLE 3

|  | Referential Example | | | | | | |
|---|---|---|---|---|---|---|---|
|  | 3 | 4 | 5 | 6 | 7 | 8 | 9 |
| Starting Materials |  |  |  |  |  |  |  |
| amount (g) used of TA | 123.6 | 123.6 | 123.6 | 132.3 | 232 | 123.6 | 123.6 |
| amount (g) used of IA | 52.9 | 52.9 | 52.9 | 44.1 | 0 | 52.9 | 52.9 |
| kind of diamine component units | $C_6DA$ | $C_6DA$ | $C_6DA$ | $C_6DA$ | $C_{10}DA$ | $C_6DA$ | $C_6DA$ |
| content (mole %) of TA component units in aromatic dicarboxylic acid component units | 70 | 70 | 70 | 75 | 100 | 70 | 70 |
| diamine/dicarboxylic acid (molar ratio) | 1.0 | 1.05 | 1.0 | 1.05 | 1.0 | 1.0 | 1.0 |
| Starting Oligomer or Polymer |  |  |  |  |  |  |  |
| ($\eta$) (dl/g, conc. $H_2SO_4$, 30° C.) | 0.10 | 0.10 | 0.98 | 0.10 | 1.10 | 0.98 | 0.10 |
| content (mole %) of TA component units in aromatic dicarboxylic acid component units | 70 | 70 | 70 | 75 | 100 | 70 | 71 |
| Polyamide |  |  |  |  |  |  |  |
| melting point (°C.) | 334 | 335 | 337 | 343 | 317 | 340 | 338 |
| content (% by weight) of 50° C. concentrated sulfuric acid-soluble polyamide | 93 | 52 | 30 | 51 | 80 | 5 | 22 |
| content (% by weight) of 50° C. concentrated sulfuric acid-insoluble polyamide | 7 | 48 | 70 | 49 | 20 | 95 | 78 |
| gel proportion (Fg) | | | | | | | |
| ($\eta$) (dl/g, conc. $H_2SO_4$, 30° C.) of 50° C. concentrated sulfuric acid-soluble polyamide | 1.20 | 1.25 | 1.82 | 0.97 | 1.51 | 2.0 | 1.83 |

TABLE 3-continued

| | Referential Example | | | | | | |
|---|---|---|---|---|---|---|---|
| | 3 | 4 | 5 | 6 | 7 | 8 | 9 |
| content (mole %) of TA component units in aromatic dicarboxylic acid component units | 70 | 70 | 70 | 75 | 100 | 71 | 70 |

EXAMPLES 1 THROUGH 9 AND COMPARATIVE EXAMPLES 1 THROUGH 4

Polyamides shown in Table 4 were heat-molded in test pieces according to the above-mentioned method.

The physical properties of the test pieces are shown in Table 4.

TABLE 4

| | Example 1 | Example 2 | Example 3 | Example 4 |
|---|---|---|---|---|
| Starting Material | | | | |
| kind of polyamide | polyamide described in Ref. Example 3 | polyamide described in Ref. Example 4 | polyamide described in Ref. Example 5 | polyamide described in Ref. Example 6 |
| amount (% by weight) | 100 | 100 | 100 | 100 |
| dicarboxylic acid charge composition (mole %) | TA/IA (70/30) | TA/IA (70/30) | TA/IA (70/30) | TA/IA (75/25) |
| diamine charge composition (mole %) | $C_6DA$, (100) | $C_6DA$, (100) | $C_6DA$, (100) | $C_6DA$, (100) |
| Polyamide Composition | | | | |
| Polyamide (A) | | | | |
| dicarboxylic acid component units (mole %) | TA/IA (70/30) | TA/IA (70/30) | TA/IA (70/30) | TA/IA (75/25) |
| diamine component units (mole %) | $C_6DA$, (100) | $C_6DA$, (100) | $C_6DA$, (100) | $C_6DA$, (100) |
| Tm (°C.) | 334 | 335 | 337 | 343 |
| $(\eta)$ (dl/g, conc. $H_2SO_4$, 30° C.) | 1.20 | 1.25 | 1.82 | 0.97 |
| Polyamide (B) | | | | |
| dicarboxylic acid component units (mole %) | TA/IA (70/30) | TA/IA (70/30) | TA/IA (70/30) | TA/IA (75/25) |
| diamine component units (mole %) | $C_6DA$, (100) | $C_6DA$, (100) | $C_6DA$, (100) | $C_6DA$, (100) |
| Gel proportion (Fg, %) | 7% | 48% | 70% | 49% |
| MFR (g/10 min, 360° C., load of 2.16 kg) | 10 | 0.3 | 0.1 | 0.1 |
| Physical Properties | | | | |
| tensile strength (kg/cm$^2$), 23° C. | 800 | 815 | 820 | 760 |
| flexural strength (kg/cm$^2$), 23° C. | 1800 | 1920 | 2010 | 1750 |
| flexural modulus ($\times 10^3$ kg/cm$^2$), 23° C. | 48 | 46 | 47 | 50 |
| Izod impact strength (kg · cm/cm), 23° C. | 4.0 | 4.4 | 4.6 | 2.7 |
| thermal distortion temperature (°C.) | 140 | 141 | 140 | 141 |
| thermal aging resistance (flexural strength (kg/cm$^2$) after 2 days' standing in air at 250° C.) | 950 | 960 | 920 | 880 |
| Taber abrasion (Δ mg) | 15 | 16 | 15 | 17 |
| kinetic friction coefficient | 0.24 | 0.23 | 0.23 | 0.22 |
| critical PV value (kg/cm$^2$ · m/sec) | 3.8 | 4.0 | 4.0 | 4.0 |
| saturated water absorption (%) | 1.3 | 1.2 | 1.2 | 1.2 |

| | Example 5 | Example 6 | Example 7* | Comparative Example 1 |
|---|---|---|---|---|
| Starting Material | | | | |
| kind of polyamide | polyamide described in Ref. Example 7 | polyamide described in Ref. Example 1 polyamide described in Ref. Example 4 | polyamide described in Ref. Example 3 | polyamide described in Ref. Example 1 |
| amount (% by weight) | 100 | 50/50 | 100 | 100 |
| dicarboxylic acid charge composition (mole %) | TA/IA (100/0) | TA/IA (70/30) | TA/IA (70/30) | TA/IA (70/30) |
| diamine charge composition (mole %) | $C_{10}DA$, (100) | $C_6DA$, (100) | $C_6DA$, (100) | $C_6DA$, (100) |
| Polyamide Composition | | | | |
| Polyamide (A) | | | | |
| dicarboxylic acid component units (mole %) | TA/IA (100/0) | TA/IA (72/28) | TA/IA (70/30) | TA/IA (71/29) |
| diamine component units (mole %) | $C_{10}DA$, (100) | $C_6DA$, (100) | $C_6DA$, (100) | $C_6DA$, (100) |
| Tm (°C.) | 317 | 335 | 334 | 334 |
| $(\eta)$ (dl/g, conc. $H_2SO_4$, 30° C.) | 1.51 | 1.10 | 1.20 | 0.98 |
| Polyamide (B) | | | | |
| dicarboxylic acid component units (mole %) | TA/IA (100/0) | TA/IA (72/28) | TA/IA (70/30) | — |
| diamine component units (mole %) | $C_{10}DA$, (100) | $C_6DA$, (100) | $C_6DA$, (100) | — |
| Gel proportion (Fg, %) | 20% | 28% | 7% | 0% |
| MFR (g/10 min, 360° C., load of 2.16 kg) | >20 | 5 | 6 | >20 |
| Physical Properties | | | | |
| tensile strength (kg/cm$^2$), 23° C. | 890 | 805 | 2300 | 580 |
| flexural strength (kg/cm$^2$), 23° C. | 1600 | 1820 | 2540 | 651 |

TABLE 4-continued

|  | | | | |
|---|---|---|---|---|
| flexural modulus ($\times 10^3$ kg/cm$^2$), 23° C. | 38 | 47 | 142 | 44 |
| Izod impact strength (kg · cm/cm), 23° C. | 8.0 | 4.2 | 9.8 | 1.3 |
| thermal distortion temperature (°C.) | 173 | 140 | >250 | 124 |
| thermal aging resistance (flexural strength (kg/cm$^2$) after 2 days' standing in air at 250° C.) | 905 | 945 | 1840 | 260 |
| Taber abrasion (Δ mg) | 5 | 15 | 34 | 16 |
| kinetic friction coefficient | 0.38 | 0.23 | — | 0.35 |
| critical PV value (kg/cm$^2$ · m/sec) | 2.8 | 3.9 | — | 1.8 |
| saturated water absorption (%) | 1.1 | 1.2 | 0.76 | 1.5 |

|  | Comparative Example 2 | Comparative Example 3 | Comparative Example 3 | Comparative Example 4* |
|---|---|---|---|---|
| Starting Material | | | | |
| kind of polyamide | polyamide described in Ref. Example 2 | polyamide described in Ref. Example 2, polyamide described in Ref. Example 4 | polyamide described in Ref. Example 8 | polyamide described in Ref. Example 1 |
| amount (% by weight) | 100 | 90/10 | 100 | 100 |
| dicarboxylic acid charge composition (mole %) | TA/IA (55/45) | TA/IA (55/45), (70/30) | TA/IA (70/30) | TA/IA (70/30) |
| diamine charge composition (mole %) | C$_6$DA, (100) | C$_6$DA, (100) | C$_6$DA, (100) | C$_6$DA, (100) |
| Polyamide Composition | | | | |
| Polyamide (A) | | | | |
| dicarboxylic acid component units (mole %) | TA/IA (55/45) | TA/IA (56/44) | TA/IA (71/29) | TA/IA (71/29) |
| diamine component units (mole %) | C$_6$DA, (100) | C$_6$DA, (100) | C$_6$DA, (100) | C$_6$DA, (100) |
| Tm (°C.) | 300 | 301 | 340 | 334 |
| (η) (dl/g, conc. H$_2$SO$_4$, 30° C.) | 1.05 | 1.08 | 2.0 | 0.98 |
| Polyamide (B) | | | | |
| dicarboxylic acid component units (mole %) | — | TA/IA (70/30) | TA/IA (69/31) | — |
| diamine component units (mole %) | — | C$_6$DA, (100) | C$_6$DA, (100) | — |
| Gel proportion (Fg, %) | 0% | 5% | 95% | 0% |
| MFR (g/10 min, 360° C., load of 2.16 kg) | >20 | >20 | 0 | >20 |
| Physical Properties | | | | |
| tensile strength (kg/cm$^2$), 23° C. | 640 | 650 | | 1200 |
| flexural strength (kg/cm$^2$), 23° C. | 700 | 720 | | 1650 |
| flexural modulus ($\times 10^3$ kg/cm$^2$), 23° C. | 30 | 31 | | 135 |
| Izod impact strength (kg · cm/cm), 23° C. | 8.0 | 8.1 | test piece could not be prepared because of poor flowability | 9.6 |
| thermal distortion temperature (°C.) | 120 | 120 | | >250 |
| thermal aging resistance (flexural strength (kg/cm$^2$) after 2 days' standing in air at 250° C.) | 250 | 280 | | 975 |
| Taber abrasion (Δ mg) | 12 | 13 | | 35 |
| kinetic friction coefficient | 0.71 | 0.70 | | — |
| critical PV value (kg/cm$^2$ · m/sec) | 1.2 | 1.2 | | — |
| saturated water absorption (%) | 1.8 | 1.7 | | 0.80 |

|  | Example 8 | Example 9** |
|---|---|---|
| Starting Material | | |
| kind of polyamide | polyamide described in Referential Example 9 | polyamide described in Referential Example 3 |
| amount (% by weight) | 100 | 100 |
| dicarboxylic acid charge composition (mole %) | TA/IA (70/30) | TA/IA (70/30) |
| diamine charge composition (mole %) | C$_6$DA (100) | C$_6$DA (100) |
| Polyamide Composition | | |
| Polyamide (A) | | |
| dicarboxylic acid component units (mole %) | TA/IA (70/30) | TA/IA (70/30) |
| diamine component units (mole %) | C$_6$DA (100) | C$_6$DA (100) |
| Tm (°C.) | 338 | 334 |
| (η) (dl/g, conc. H$_2$SO$_4$, 30° C.) | 1.83 | 1.20 |
| Polyamide (B) | | |
| dicarboxylic acid component units (mole %) | TA/IA (70/30) | TA/IA (70/30) |
| diamine component units (mole %) | C$_6$DA (100) | C$_6$DA (100) |
| Gel proportion (Fg, %) | 78% | 7% |
| MFR (g/10 min, 360° C., load of 2.16 kg) | 0.1 | 6 |
| Physical Properties | | |
| tensile strength (kg/cm$^2$), 23° C. | 825 | 2200 |
| flexural strength (kg/cm$^2$), 23° C. | 2100 | 2320 |
| flexural modulus ($\times 10^3$ kg/cm$^2$), 23° C. | 47 | 110 |
| Izod impact strength (kg · cm/cm), 23° C. | 4.7 | 9.0 |
| thermal distortion temperature (°C.) | 139 | 220 |
| thermal aging resistance (flexural | 940 | 1580 |

TABLE 4-continued

| | | |
|---|---|---|
| strength (kg/cm$^2$) after 2 days' standing in air at 250° C.) | | |
| Taber abrasion (Δ mg) | 12 | 30 |
| kinetic friction coefficient | 0.25 | — |
| critical PV value (kg/cm$^2$ · m/sec) | 4.1 | — |
| saturated water absorption (%) | 1.2 | 0.82 |

Note
*product having 40% of glass fiber incorporated
**product having 20% of glass fiber incorporated

What is claimed is:

1. A polyamide composition having a fraction insoluble in concentrated sulfuric acid at 50° C. and a fraction soluble in concentrated sulfuric acid at 50° C. comprising a polycondensate consisting of (a) an aromatic acid component consisting essentially of 60 to 100 mole % of terephthalic acid component units and 40 to 0 mole % of units of an aromatic dicarboxylic acid component other than the terephthalic acid component and (b) units of an aliphatic alkylene-diamine component having 6 to 18 carbon atoms, wherein the gel proportion (Fg) defined by the following formula:

$$Fg = Wg/W \times 100 \qquad (1)$$

wherein W stands for the weight in grams of the polyamide composition and Wg stands for the weight in grams of the fraction of the polyamide composition which is insoluble in concentrated sulfuric acid at 50° C., is in the range of from 3% to 90%, and the fraction soluble in concentrated sulfuric acid at 50° C. has an intrinsic viscosity (η) of at least 0.5 dl/g as measured in concentrated sulfuric acid as 30° C.

2. A composition as set forth in claim 1, wherein the gel proportion (Fg) is 5 to 80%.

3. A composition as set forth in claim 1, wherein the units of the aromatic dicarboxylic acid component other than the terephthalic acid component are units of an isophthalic acid component or naphthalene-dicarboxylic acid component.

4. A composition as set forth in claim 1, wherein the aliphatic dialkylene-diamine component is 1,6-diaminohexane, 1,8-diamino-octane, 1,10-diaminodecane or 1,12-diaminododecane.

5. A composition as set forth in claim 1, wherein the aliphatic alkylene-diamine component (b) is 1,6-diaminohexane and the aromatic dicarboxylic acid component (a) consists essentially of 60 to 85 mole % of a terephthalic acid component and 40 to 15 mole % of an isophthalic acid component.

6. A composition as set forth in claim 1, wherein the aliphatic alkylene-diamine component (b) is 1,6-diaminohexane, the aromatic dicarboxylic acid component (a) consists essentially of 60 to 85 mole % of a terephthalic acid component and 40 to 15 mole % of an isophthalic acid component, and the melt flow rate of the polyamide composition is 0.01 to 100 g/10 min as measured at a temperature of 360° C. under a load of 2.16 Kg.

7. A composition as set forth in claim 1, wherein a powdery filler having an average particle size of 1 mμ to 100 μ is incorporated in an amount of 0.5 to 100 parts by weight per 100 parts by weight of the polyamide.

8. A composition as set forth in claim 1, wherein an organic or inorganic fibrous filler having an average length of 0.1 to 20 mm is incorporated in an amount of 5 to 200 parts by weight per 100 parts by weight of the polyamide.

* * * * *